United States Patent
Berth et al.

(10) Patent No.: US 6,218,792 B1
(45) Date of Patent: Apr. 17, 2001

(54) CIRCUIT ARRANGEMENT OF MODULAR DESIGN, IN PARTICULAR FOR PROPULSION OFF A RAILROAD VEHICLE

(75) Inventors: Matthias Berth, Baden; Rolf Schifferli, Wil, both of (CH)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/390,676

(22) Filed: Sep. 7, 1999

(30) Foreign Application Priority Data

Sep. 9, 1998 (DE) ............................................. 198 41 132

(51) Int. Cl.$^7$ ..................................................... H02K 41/00
(52) U.S. Cl. ................................ 318/38; 363/65; 105/49; 361/729
(58) Field of Search ................................ 318/34, 38, 111, 318/112, 113; 105/49, 140; 363/65; 361/728, 729, 733

(56) References Cited

U.S. PATENT DOCUMENTS

| | | | |
|---|---|---|---|
| 4,289,997 | * 9/1981 | Jung et al. | 318/113 |
| 5,629,591 | * 5/1997 | Thevenon | 318/107 |
| 6,023,137 | * 2/2000 | Kumar et al. | 318/254 |
| 6,052,293 | * 4/2000 | Ivner et al. | 363/36 |
| 6,078,173 | * 6/2000 | Kumar et al. | 324/158.1 |

FOREIGN PATENT DOCUMENTS

| | | |
|---|---|---|
| 3326948A1 | * 1/1985 | (DE) . |
| 8513761 | 1/1989 | (DE) . |
| 9015660 | 2/1991 | (DE) . |
| 19501660A1 | 7/1996 | (DE) . |
| 19630284A1 | 1/1998 | (DE) . |

* cited by examiner

Primary Examiner—Robert E. Nappi
Assistant Examiner—Rina I. Duda
(74) Attorney, Agent, or Firm—Burns, Doane, Swecker & Mathis, L.L.P.

(57) ABSTRACT

A circuit arrangement (3) of modular design, in particular for propulsion of a railroad vehicle, having at least two series-connected, power-electronic modules ($M_1$, $M_2$, ... $M_n$), which each have a DC isolation point. A first ($M_1$) of these modules is connected to high voltage and a second ($M_1$) is connected to frame or ground potential. The first module ($M_1$) has a first power-electronics assembly (4) which is at high voltage and is connected to a power-electronics assembly (4) (which is at a lower potential) of the second or of a third module ($M_2$). The power-electronics assemblies (4) of each module are arranged in one of several equivalent and dielectric material housings (10), each of which is normally designed in a cuboid shape. The housings (10) are arranged parallel and at a short distance away from one another with regard to their height on a plate (9) which is at frame or ground potential. On its top surface (11), bottom surface (12) and front face (13), each housing (12) has an electrically conductive layer which is connected to frame or ground potential. An electrical connection for a contact (16, 17) of a contact arrangement which produces the series circuit of these two modules ($M_1$, $M_2$) is passed through the mutually facing side surfaces (14, 15) of the dielectric material housings (10) of in each case two of the modules ($M_1$, $M_2$). The devices (4) and the contact arrangement are thus shielded in a dielectric beneficial manner.

10 Claims, 2 Drawing Sheets

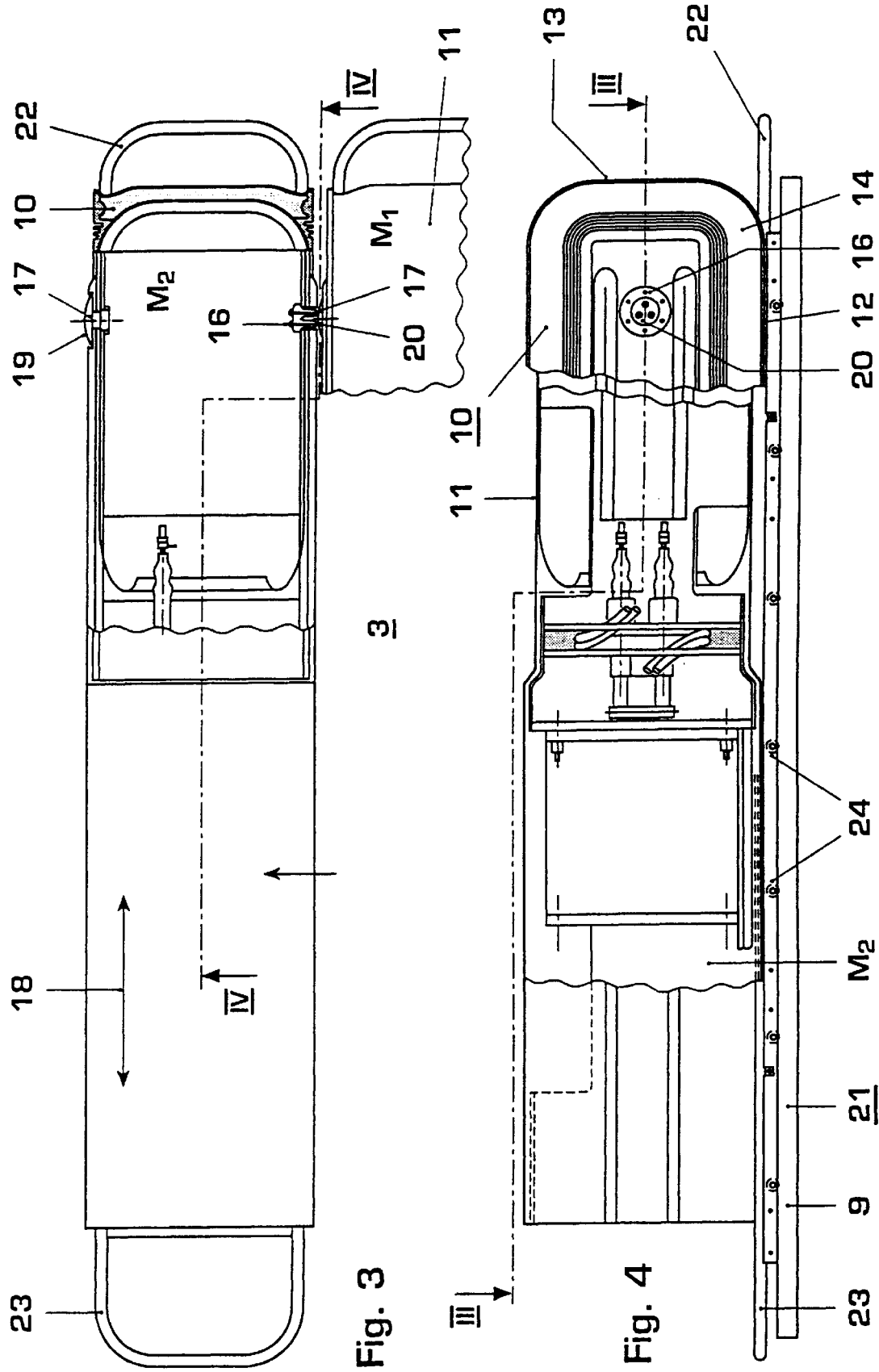

US 6,218,792 B1

CIRCUIT ARRANGEMENT OF MODULAR DESIGN, IN PARTICULAR FOR PROPULSION OFF A RAILROAD VEHICLE

BACKGROUND OF THE INVENTION

1. Field of the Invention

The invention is based on a circuit arrangement of modular design, in particular for propulsion of a railroad vehicle, as claimed in the preamble of patent claim 1.

2. Discussion of Background

A circuit arrangement of the type mentioned initially is described, in particular, in FIG. 6 of DE 196 30 284 A1. This circuit arrangement comprises n partial converter modules 40.1, . . . , 40.n, which are connected in series with one another and have outputs which are connected in parallel with one another. The outputs can be connected to partial converter modules 41.1, . . . 41.m, each having a traction motor 42.1, . . . , 42.m. The partial converter modules 40.1, . . . 40.n split the relatively high AC voltage between the traction wire 36 and the rail 37 of propulsion for a railroad vehicle corresponding to the number n of converter modules. A low output voltage is produced at the outputs of the partial converter modules 40.1, . . . 40.n, reduced corresponding to the number of modules n, is, in each case DC-isolated from the input voltage by a transformer 6 (FIG. 1) and feeds the traction motors 42.1, . . . 42.m, via the partial converter modules 43.1, . . . 43.m. Conversely, when the railroad vehicle is being braked, the traction motors can also feed power into the power supply system via the partial converter module. Since only a low voltage is supplied to each of the partial converter modules, they can be operated in a cost-effective manner using semiconductor switches 11 (FIG. 1) having a normal withstand voltage.

SUMMARY OF THE INVENTION

Accordingly, one object of the invention as it is specified in the patent claims is to provide a novel circuit arrangement of the type mentioned initially, which saves as much space as possible.

In the circuit arrangement according to the invention, the modules each have a dielectric material housing which is normally designed in a cuboid shape and the individual housings are arranged close to one another on a mounting board and the power-electronic assemblies are connected to one another via contact arrangements which are passed through adjacent side walls of the housings. The circuit arrangement can thus be accommodated in an extremely spacesaving manner and in a dielectrically safe manner in a flat area, which can advantageously be located under the floor level of a railroad vehicle. Since the individual dielectric material housings are arranged close to one another, since their front, top and bottom surfaces each have an electrically conductive layer which is connected to ground or frame potential, and since the electrical connections of the individual modules are passed through closely adjacent side walls, the entire circuit arrangement is located in a dielectrically well sealed housing which is safe to touch. Since the dielectric material housings of the individual modules are of identical design, they can on the one hand be manufactured particularly cost-effectively and, on the other hand, when required, the modules can be interchanged with one another and can be replaced by a replacement module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a view of two adjacent modules $M_1$, $M_2$ of the circuit arrangement shown in FIGS. 1 and 2, of which the module $M_2$ is sectioned along a line III—III which can be seen in FIG. 4, and FIG. 4 shows a side view of the module $M_2$ shown in FIG. 3, sectioned along the line IV—IV, in which a part of the module which is not sectioned is illustrated slightly enlarged.

DESCRIPTION OF THE PREFERRED EMBODIMENT

Figure 1:
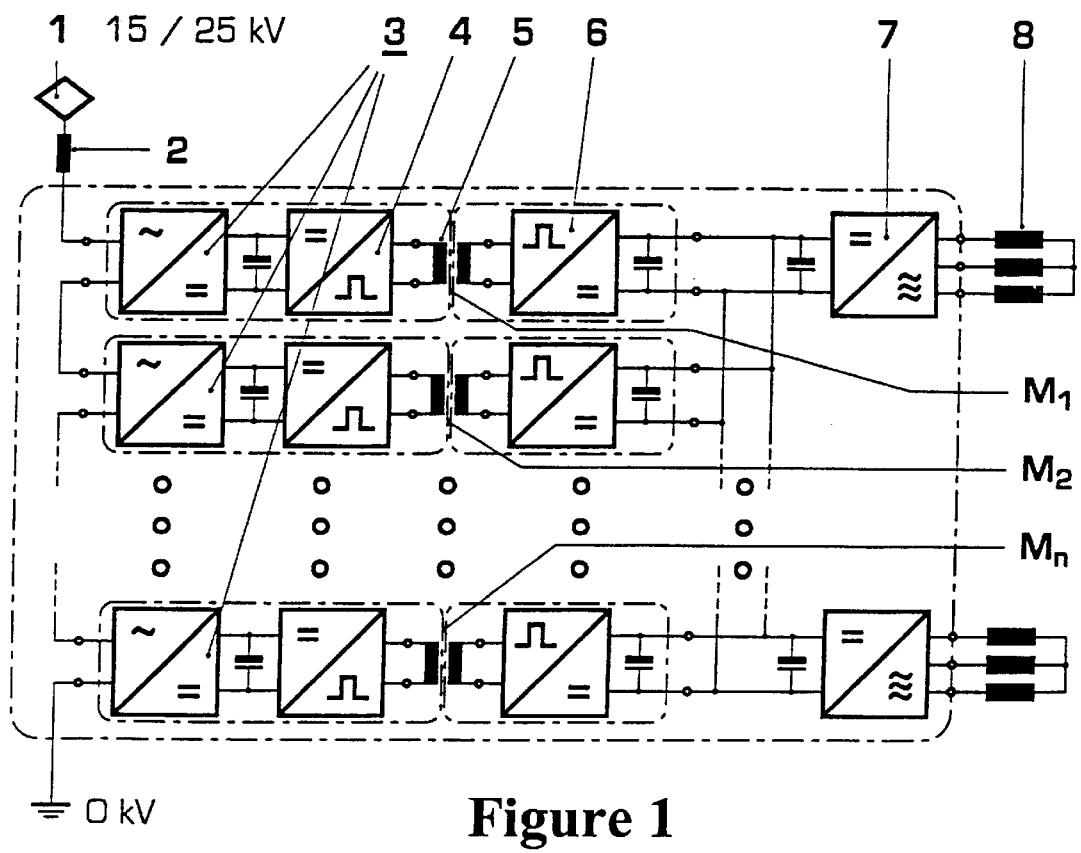
FIG. 1 shows a block diagram of the drive for a railroad vehicle having a circuit arrangement of modular construction according to the invention.

Referring now to the drawings, wherein like reference numerals designate identical or corresponding parts throughout the several views, the drive for a railroad vehicle, which is illustrated as a block diagram, contains an electrical pick-up 1, which can be guided on a high-voltage cable with an AC voltage of, for example, 15 or 25 kV and is connected via an input induction coil 2 to a first input (which is at high potential) of a circuit arrangement 3. A second input of the circuit arrangement 3 is connected to ground potential or frame. The circuit arrangement 3 is formed from n (n=2, 3, . . . ) series-connected power-electronics modules $M_1$, $M_2$, . . . $M_n$ which each have a DC isolation point and of which the module $M_1$ is at high voltage and the module $M_n$ is at frame or ground potential. The modules are of identical design and each have power electronics, which are surrounded by a dielectric material housing and are designed as a converter system, as well as two inputs, one of which is connected to the upstream module in series circuit, and a second of which is connected to the downstream module in the series circuit. In contrast to this, the first input of the module $M_1$ is at high voltage, and the second input of the module $M_n$ is at ground potential or frame. Each module has a power-electronics assembly 4 which is connected to the two inputs, a transformer 5 which forms a DC isolation point, and a power-electronics assembly 6 which is connected downstream of the transformer 5 and has two outputs which pass out of the module. The outputs lie parallel and are connected via m(m=1,2, . . . ) converter systems 7 to m traction motors 8.

Figure 2:
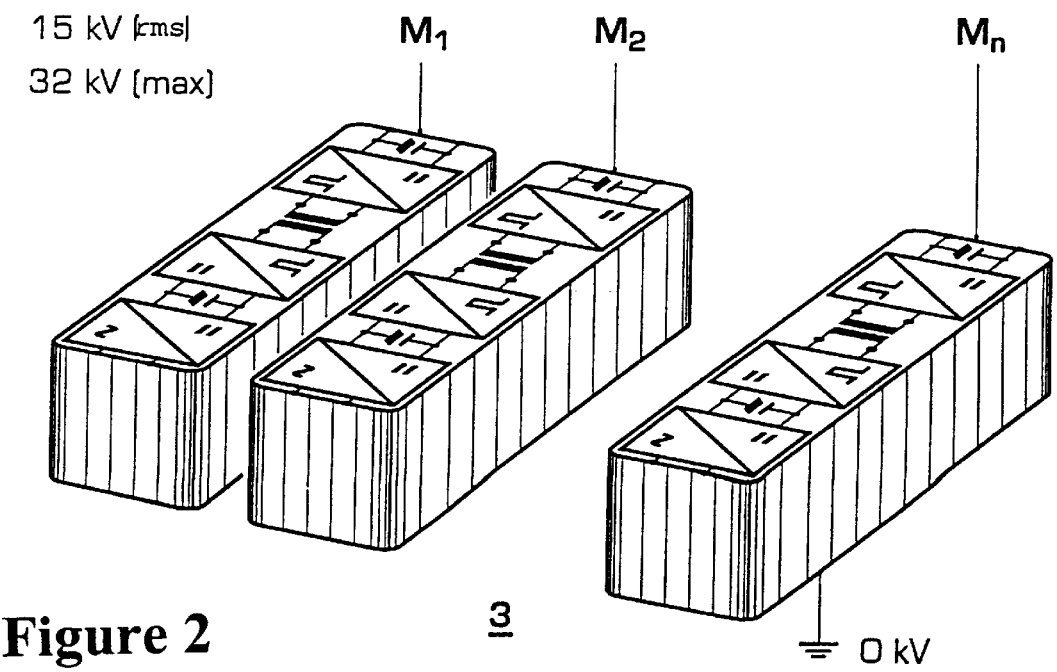
FIG. 2 shows a perspective view of the circuit arrangement shown in FIG. 1, illustrated in highly simplified form.

As can be seen from FIGS. 2 to 4, the modules have an essentially cuboid design and are arranged parallel to one another and at a short distance apart from one another compared with their height, on a plate 9 (FIG. 4) which is at frame or ground potential. It can be seen from FIGS. 3 and 4 that the modules each have a dielectric material housing 10 which is normally designed in a cuboid shape. On their top surface 11 and bottom surface 12 as well as their front face 13 (which is closed at the front) the dielectric material housings 10 each have an electrically conductive layer which can be kept at frame or ground potential. An electrical connection for a contact 16, 17 of a contact arrangement which produces the series circuit of the two modules in each case passed through the mutually facing side surfaces (14, 15) of two adjacent modules in each case.

The modules $M_1$, $M_2$ . . . are each mounted moveably on the plate 9, at right angles to the front face 13 of the dielectric material housing 10. The contact arrangement can be operated by moving two adjacent modules with respect to one another. One of the two contacts 16, 17 of the contact arrangement, namely the contact 17, has a guide surface 19 which is inclined with respect to the pushing direction (double arrow 18 in FIG. 3), interacts with the mating contact 16 on movement and, depending on the direction in which the module is pushed, is engaged with or disengaged from pins 20, which are mounted in a sprung manner, of the mating contact 16.

It can be seen from FIG. 4 that there is an essentially rectangular guide element 21, in the form of a slide and with handles 22, 23, on the bottom surface of the module $M_2$. On its longitudinal sides which act as runners, this guide element has rollers 24, which are guided on two rails (which are not shown) that are formed in the plate 9. The handles project beyond the dielectric material housing 10 on the front face 13 and/or rear face of the dielectric material housing 10. The module can thus be handled in a particularly advantageous manner.

During assembly of this circuit arrangement, the individual modules $M_1, M_2, \ldots M_n$ are pushed onto the plate 9 one after the other. The plate 9 represents the bottom surface of a flat area, which can be arranged under the floor level in a railroad vehicle. During the pushing-on process, the contacts 16, 17 are electrically directly connected to one another, forming the series circuit. Since the individual modules are only a short distance away from one another, the coated surfaces 11, 12 and 13 of the dielectric material housing 10 of adjacent modules effectively shield the contacts 16, 17 on the outside, so that the circuit arrangement is accommodated as a compact, dielectrically shielded block in the flat area, such that it is safe to touch.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A circuit arrangement of modular design, having at least two series-connected, power-electronic modules, which each have a DC isolation point and of which a first module is connected to high voltage, and a second module is connected to frame potential, in which case the first module has a first power-electronics assembly which is at high voltage and is connected to a lower potential of a power-electronics assembly of at least one of the second and a third module, wherein the power-electronics assemblies of the at least two of the first, second and third modules are each arranged in a dielectric material housing which is in a cuboid shape, the dielectric material housings being of identical design, arranged parallel to one another and, with regard to their height a short distance apart from one another, on a plate which is at frame potential, and each dielectric material housing having an electrically conductive layer which is connected to the frame potential on its top surface and bottom surface as well as on its front face which is terminated at a front of the dielectric material housing, and wherein an electrical connection for a contact of a contact arrangement which produces a series circuit of the at least two modules is in each case passed through mutually facing side surfaces of the dielectric material housing of each of the at least two modules.

2. The circuit arrangement as claimed in claim 1, wherein the modules, are in each case mounted on the plate such that they can be moved vertically with respect to the front face of the dielectric material housing.

3. The circuit arrangement as claimed in claim 2, wherein the contact arrangement can be operated by moving two adjacent modules with respect to one another.

4. The circuit arrangement as claimed in claim 3, wherein the contact of the contact arrangement has a guide surface for a mating contact of the contact arrangement, which guide surface is aligned at an angle with respect to a pushing direction.

5. The circuit arrangement as claimed in claim 1, wherein the bottom surface of at least one of the modules has a guide element which can be moved on the plate.

6. The circuit arrangement as claimed in claim 5, wherein the guide element is designed like a slide.

7. The circuit arrangement as claimed in claim 6, wherein the slide has at least one handle which overhangs at least one of the front face and a rear face of the dielectric material housing.

8. The circuit arrangement as claimed in claim 7, wherein rollers which are supported on guide rails on the plate are mounted on the runners of the slide.

9. The circuit arrangement as claimed in claim 1, in combination with a railroad vehicle propulsion system.

10. The circuit arrangement as claimed in claim 1, wherein said frame potential is at ground potential.

* * * * *